Sept. 2, 1969   D. H. CULLEN   3,464,556
FILTER WITH BY-PASS VALVE AND INDICATOR
Filed March 11, 1968   2 Sheets-Sheet 1

INVENTOR
DOUGLAS H. CULLEN
BY
ATTORNEY

Sept. 2, 1969  D. H. CULLEN  3,464,556
FILTER WITH BY-PASS VALVE AND INDICATOR
Filed March 11, 1968  2 Sheets-Sheet 2
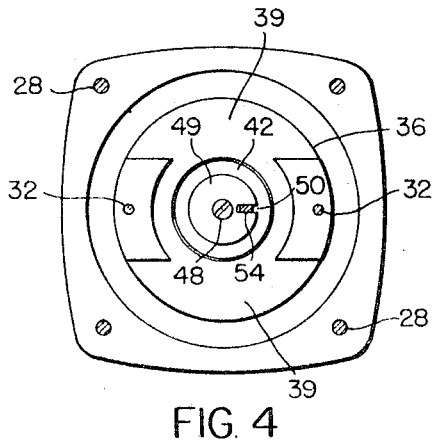
FIG. 3  FIG. 4
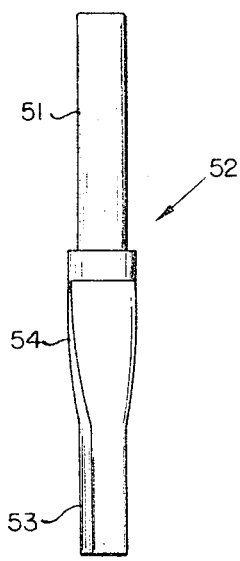
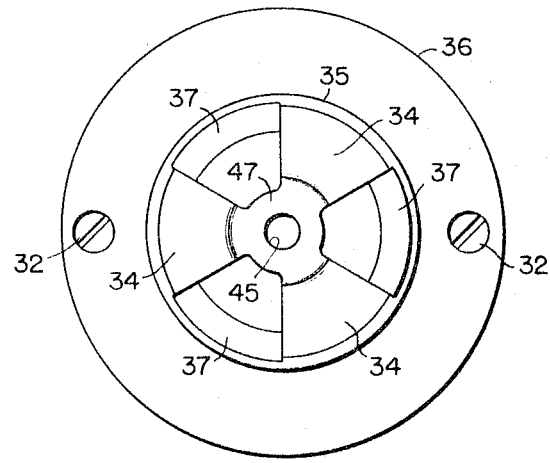
FIG. 5
INVENTOR
DOUGLAS H. CULLEN
BY *R.F. Eshlinger*
ATTORNEY

United States Patent Office

3,464,556
Patented Sept. 2, 1969

3,464,556
FILTER WITH BY-PASS VALVE AND INDICATOR
Douglas H. Cullen, Ontario, N.Y., assignor to Dollinger Corporation, Rochester, N.Y., a corporation of New York
Filed Mar. 11, 1968, Ser. No. 712,125
Int. Cl. B01d 35/14, 27/10
U.S. Cl. 210—90                          2 Claims

ABSTRACT OF THE DISCLOSURE

In this filter, the filter cartridge is seated at one end around the outlet of the filter housing and with its other end around a by-pass valve housing which projects into the bore of the filter cartridge. The valve housing has separate sets of by-pass ports in its inner and outer ends. Normally a spring-pressed piston, constituting the valve, prevents communication between the two sets of ports. When the filter element becomes clogged, however, the reduced pressure in the bore of the filter element permits the piston to be forced inwardly against the spring resistance by the pressure of the liquid flowing into the outer set of by-pass ports, thereby allowing the liquid to flow from the outer to the inner set of ports, and through the bore of the filter element to the outlet. A cam follower secured to the piston to reciprocate therewith pivots an indicator to indicate the relative cleanliness of the filter element.

---

This invention relates to filters, and more particularly to a filter of the type having a removable filter cartridge, and means for bypassing the cartridge when it becomes excessively dirty.

Filters of thhis type heretofore have been relatively complicated, and expensive particularly because of the difficulty of securing a satisfactory indication of the condition, at any time, of the filter element. This has added considerably to the overall cost of the filter.

An object of this inventon is to provide a substantially more compact and inexpensive filter of the type described.

A more specific object of this invention is to provide a single pressure-responsive member for operating both the bypass and indicating means in filters of the type described.

A further object of this invention is to provide an improved filter of the type described, which can be more readily dismantled and cleaned than prior such filters.

Other objects of the invention will be apparent hereinafter from the specification and from the recital of the appended claims, particularly when read in conjunction with the accompanying drawing.

In the drawing:

FIG. 3 is an elevation of the cam which operates the cleanliness indicator of the filter;

FIG. 4 is a sectional view taken along the line 4—4 in FIG. 1 looking in the direction of the arrows; and FIG. 5 is an enlarged bottom plan view of the bypass housing.

Figure 1:
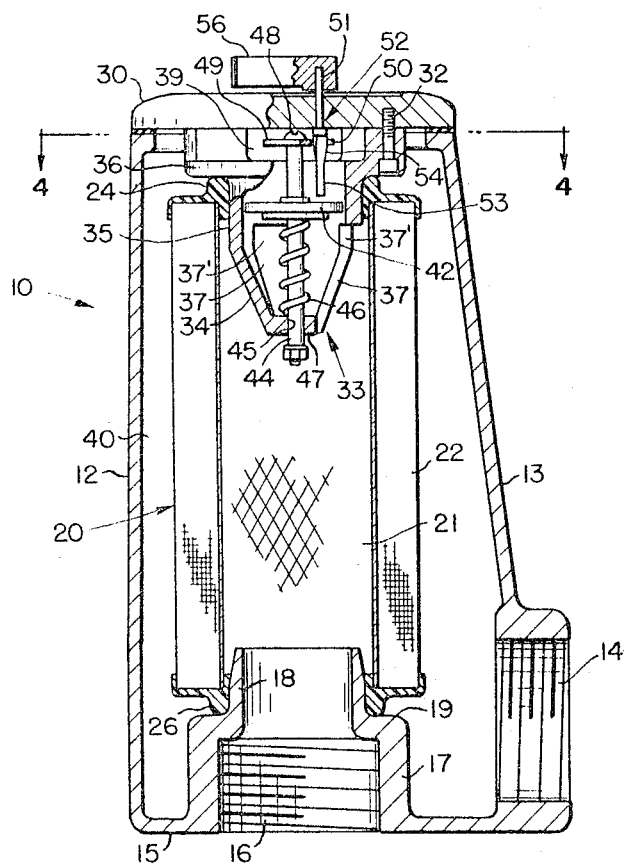
FIG. 1 is a vertical sectional view through a filter made in accordance with one embodiment of this invention, portions of the filter being shown in full.

Referring now to the drawing by numerals of reference, the filter 10 comprises an elongate housing 12, which is generally rectangular in cross section but has one side wall 13 inclined slightly intermediate its ends as shown in FIG. 1. At one end thereof housing 12 has internally threaded inlet and outlet ports 14 and 16, respectively, which are formed at right angles to one another in housing walls 13 and 15, repectively. Outlet port 16 extends through a collar 17, that is of reduced diameter at its inner end as denoted at 18, and is formed with a shoulder 19 at the juncture of its reduced diameter portion 18 with the main portion of the collar.

Removably mounted in the housing 12 is a conventional filter cartridge 20, having a central bore 21 surrounded by, for instance, a pleated, porous filter element 22. Filter element 22 may be, for instance, of the type disclosed in U.S. Patent No. 2,962,121, granted Nov. 29, 1960 and be provided with a plurality of longitudinally extending pleats, opposite ends of which are embedded in plastic end caps 24 and 26, respectively. Cap 26 is removably and sealingly positioned around the collar 18 and against the shoulder 19, so that outlet 16 is sealingly connected to the cartridge bore 21.

Removably fastened by screws 28 to the opposite end of housing 12 remote from ports 14 and 16 is a flat, metal cover 30. Removably secured by screws 32 to the inside of the cover 30 to project into the bore 21 in the cartridge 20 is a valve housing 33. Housing 33 has at its inner end a truncated conical wall portion 34, and intermediate its ends a cylindrical wall portion 5. Portion 35 fits tightly and sealingly in the bore in the cap 24 on cartridge 20. An integral ring flange 36 extends from the outer end of wall 35 radially over cap 24.

At quasi-angularly spaced points thereabout the conical skirt portion 34 of the housing 33 has therein through openings 37 (only two of which are illustrated in FIG. 1), which connect bore 21 of cartridge 20 with the interior of housing 33. These openings 37 extend as at 37' into the annular wall 35 of the housing for reasons noted below.

Flange 36 is secured against the inside of cover 30 by the screws 32. Flange 36 has two angularly spaced ports or openings 39 in it, which connect the space 40 between the cartridge 20 and the internal wall of housing 12 with the interior of valve housing 33.

Mounted for axial sliding movement in the bore of wall portion 35 of housing 33 is a piston 42. Piston 42 is preferably made of "Teflon" (tetrafluorethylene fluorocarbon resin), so that O-ring seals between it and the internal wall of by-pass housing section 35 can be eliminated. It slides directly in housing section 35.

Fixed in the piston, and projecting axially beyond opposite ends thereof, is a rod 44, the inner end of which extends slidably through a hole 45 formed centrally in the wall or web 47 of housing 33. Surrounding rod 44 and interposed between piston 42 and web 47 is a coiled compression spring 46, which urges the piston 42 axially outwardly in the bore of wall portion 35.

Secured by a screw 48 to the outer end of rod 44 is a cam follower or disc 49. Journaled in cover 30 to rotate about an axis spaced from, and parallel to, the axis of rod 44 is a pin or cam 52, which projects beyond the inside of cover 30 slidably through a narrow slot 50 in follower 49. Cam 52 is twisted intermediate its ends for a portion of its length, as at 54, but its inner end portion 53 extends straight and in the direction of its axis. The outer end 51 of pin 52 is cylindrical and projects beyond cover 30, and has an indicator or pointer 56 secured thereto by a set screw 55. Pointer 56 registers with indicia on the outside of cover 30. This indicia is adapted to give visible indication of the relative cleanliness of the filter cartridge 20.

In use, filter 10 may be mounted horizontally on a machine, or the like, and fluid may be pumped or drawn, for example by a suction pump (not illustrated) connected to outlet 16, through inlet port 14 into the space 40 between the cartridge 20 and housing 12, and radially through cartridge 20 to the outlet port 16. Normally piston 42 will be held by spring 46 in its outermost position (FIG. 1), wherein slot 50 in the follower 49 is engaged with the twisted portion 54 of pin 52. In this position, piston 42 is disposed outwardly of the openings 37 in housing secton 34, and fluid entering housing 33 through openings 39 cannot flow inwardly beyond the piston 42. Consequently the incoming fluid normally passes radially through the cartridge 20 and is filtered by filter element 22 before passing out port 16.

As, through continued use, the filter element becomes clogged, it becomes progressively more difficult to pump fluid radially through the cartridge, the pressure in bore 21 drops, and the pressure differential between the fluid in bore 21 and the fluid in space 40 increases, thereby causing increase in the pressure exerted by the fluid on the outer side of the piston 42 (FIG. 1) as compared to the pressure exerted on the inside of the piston by spring 46. This causes piston 42 to be forced inwardly into the bore of by-pass housing 33 against the resistance of spring 46. This movement is transmitted to cam follower 49; and it slides inwardly on the twisted portion 54 of the pin 52, so that the latter is pivoted, for example clockwise in FIG. 2, from a position of rest, where it indicates that the filter cartridge is clean, indicating the condition of the cartridge.

When this pressure differential increases to the point where the outer end of piston 42 passes inwardly beyond the ends 37' of the ports or openings 37, the space 40 between cartridge 20 and the housing 12 will be placed in communication directly with the bore 21 in the cartridge through openings 39 and 37. This permits incoming fluid to pass directly through by-pass housing 33 to the bore 21 without first being filtered through the cartridge. The further the piston 42 is driven into housing 33, the greater will be the quantity of fluid that is permitted to pass through the openings 37.

This inward movement of piston 42 will cause indicator 56 to be pivoted ultimately from the "Clean" to the "Danger" position at which it should be removed and cleaned, or replaced. The extreme inner end 53 of cam 52 is not twisted, so that as follower 49 slides on this end of the pin, i.e., inwardly of the twisted portion 54— the indicator 56 will not pivot any further and so will not be damaged.

From FIG. 1 it will be apparent that piston 42 must move inwardly some distance from its normal position before its outer end will pass beyond the ends 37' of the openings 37. The piston thus first actuates indicator 56 to provide a visual indication of the approaching dangerous condition of the filter cartridge 20; but the piston does not allow fluid to bypass the cartridge 20 until the radial flow of liquid through the cartridge has been so restricted as to threaten damage. It is when the clogged condition of the filter cartridge becomes dangerous that the piston opens the ports 37 so that the liquid will by-pass the filter element and exhaust into port 16.

Figure 2:
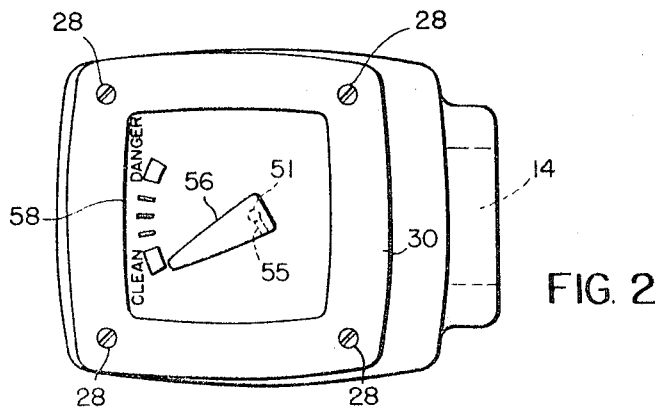
FIG. 2 is a plan view of this filter.

To remove the filter the screws 28 are removed, so that the cover 30 and attached housing 33 may first be removed as a unit from the cartridge 20. The cartridge may then be removed and cleaned or replaced, after which a new or cleaned cartridge is placed in housing 12, the by-pass housing 33 is inserted into the cleaned or new cartridge, and the cover 30 is resecured in housing 12. Each time the cover 30 and housing 33 are removed, the spring 46 will automatically return the piston 42 to its outermost position, and consequently the indicator 56 to its normal position (FIG. 2).

From the foregoing it will be apparent that applicant has devised a relatively simple, compact and reliable filter unit, which utilizes a single piston both to provide a by-pass and operate an indicator. As the filter pores become clogged, the piston first actuates the indicator 56 to indicate that the filter is becoming dirty, and thereafter gradually opens the ports 37 so that increasing quantities of fluid may be by-passed around the cartridge 20. Obviously the tension in the spring 46 or the disposition of the piston 42 along the rod 44 may be adjusted to alter the pressure differential or the time it takes to open the ports 37 as the cartridge becomes dirty.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. A filter, comprising:
   a first housing having spaced inlet and outlet ports for circulating a liquid through the housing,
   a cover removably secured over an opening in one end of said housing,
   a porous filter element removably secrued in a stationary position in said housing between said ports, and having a central bore sealingly connected at one end around said outlet port,
   a hollow, stationary valve housing removably secured at one end to the inside of said cover, and having intermediate its ends an annular wall portion sealingly engaged in the opposite end of said central bore in said element, and having a frusto-conical skirt portion projecting from said annular wall portion into said central bore coaxially thereof,
   said valve housing having in said one end thereof a first by-pass port outside said filter element and operatively connecting the interior of said valve housing with said inlet port, and
   said valve housing having in said frusto-conical skirt portion, and positioned inside said filter element, a second by-pass port, axially spaced from said first by-pass port, and operatively connecting the interior of said valve housing with said central bore,
   an indicator pivotally mounted on the exterior of said cover to indicate the relative cleanliness of said element,
   a piston-type valve reciprocably mounted in said annular wall portion of said valve housing,
   a rod secured to said valve and projecting from opposite ends of said valve, and having one end slidable in a guide opening in said skirt portion and having its opposite end operatively connected to said indicator to move said indicator in response to the reciprocation of said valve, and
   a spring in said valve housing constantly urging said valve resiliently toward a closed position in which it is disposed between the two by-pass ports to block the flow of liquid from one to the other of said by-pass ports, and through said valve housing,
   said valve being axially shiftable in one direction against the resistance of said spring upon increase of the fluid pressure differential in said first housing between the exterior of said filter element and its interior, due to decrease in the cleanliness of said element, and, when shifted a predetermined distance in said one direction, unblocking said by-pass ports and putting them in communication, thereby to allow fluid to by-pass said filter element by flowing from said inlet port through said valve housing into said central bore,
   said indicator being secured to the outer end of a pin which is journaled in said cover to pivot about an axis parallel to the direction of reciprocation of said valve,
   said pin having intermediate its ends an axially extending helically twisted portion projecting into said valve housing, and having an untwisted inner end disposed beneath said twisted portion, and a follower fixed to said rod for reciprocation therewith, and slidably connected to said pin to impart rotation to said pin upon movement thereof longitudinally of said twisted portion only.

2. A filter as defined in claim 1, wherein:
said valve housing has at said one end thereof a plurality of spaced, axial projections that are removably seated against said cover,
said first by-pass port is one of a plurality of angularly spaced openings formed between said cover and said spaced projections, and
said second by-pass port is one of a plurality of spaced openings formed in said skirt portion and extending into said annular wall portion.

References Cited
UNITED STATES PATENTS

| | | | |
|---|---|---|---|
| 3,103,952 | 9/1963 | Whiting | 210—90 X |
| 3,276,586 | 10/1966 | Rosaen | 210—90 |
| 3,295,679 | 1/1967 | Rosaen | 210—90 |
| 3,291,307 | 12/1966 | Rosaen | 210—90 |

SAMIH N. ZAHARNA, Primary Examiner

U.S. Cl. X.R.

116—70; 210—130